Sept. 11, 1956

C. B. USCHMANN 2,762,258

ENLARGER-REDUCER

Filed May 20, 1953

INVENTOR.
Curt B. Uschmann

Sept. 11, 1956
C. B. USCHMANN
2,762,258
ENLARGER-REDUCER
Filed May 20, 1953
4 Sheets-Sheet 3
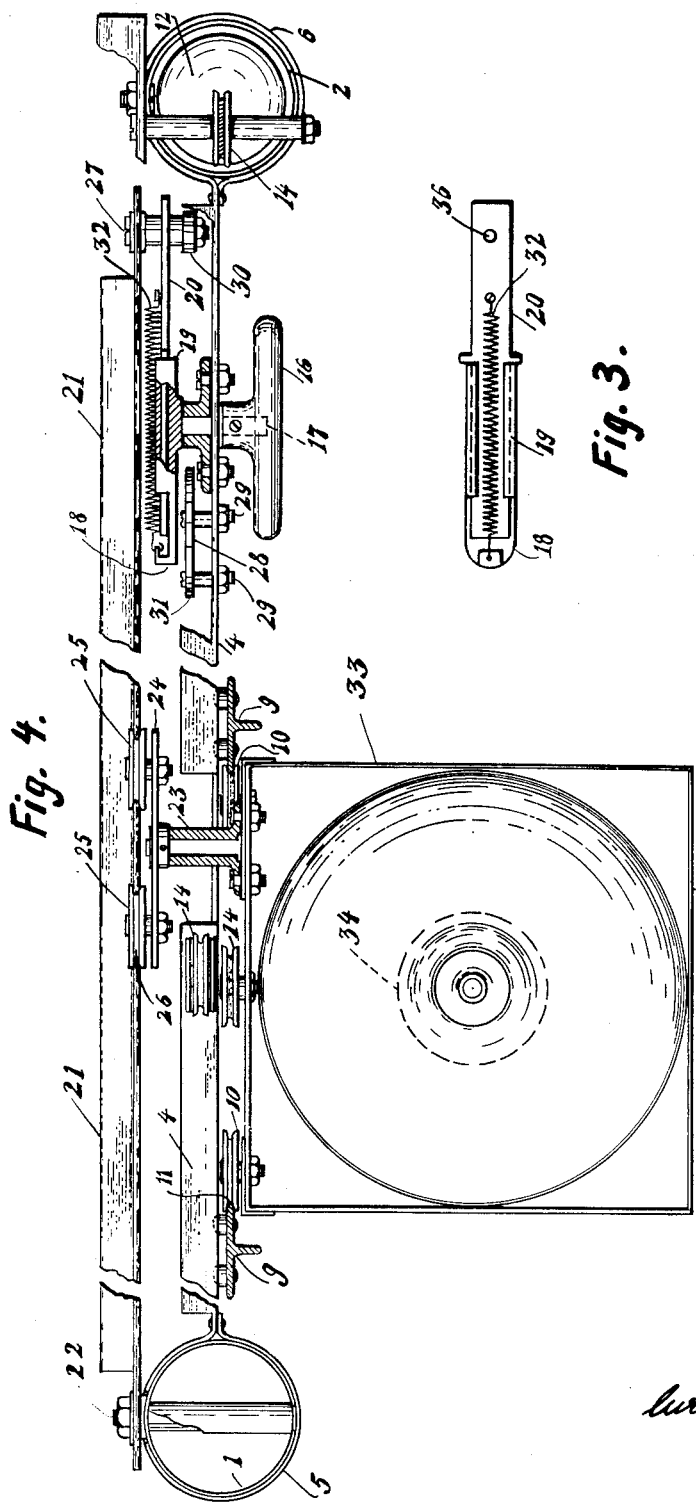
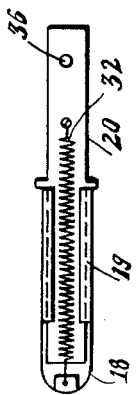
INVENTOR.
Curt B. Uschmann

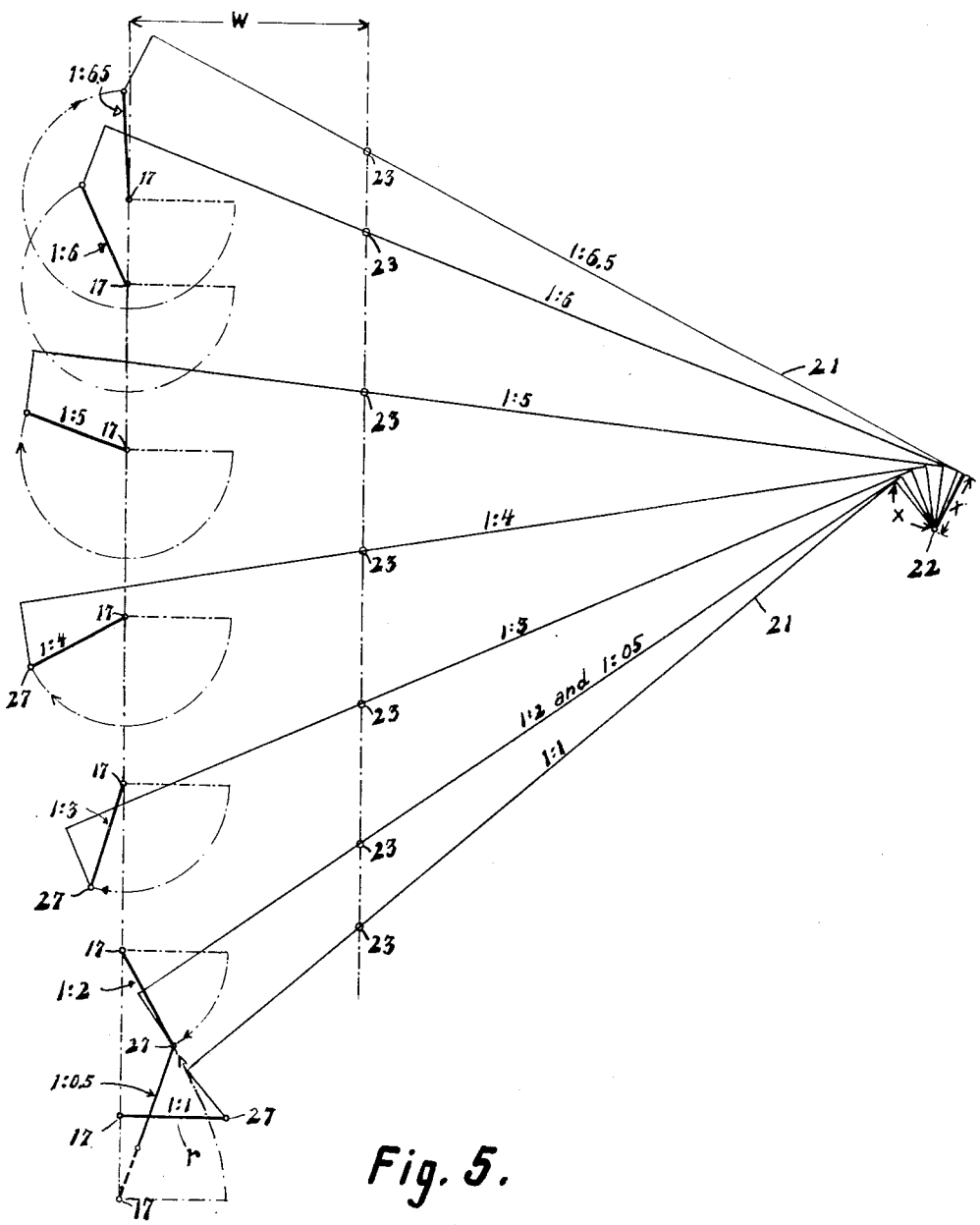

United States Patent Office 2,762,258
Patented Sept. 11, 1956

2,762,258

ENLARGER-REDUCER

Curt B. Uschmann, West Moorestown, N. J.

Application May 20, 1953, Serial No. 356,166

8 Claims. (Cl. 88—24)

My invention relates to improvements in enlarger-reducers of the auto-focusing type.

The primary object of my invention is to permit the automatic focusing of an image of an object with but a single manual adjustment of the projector. By the use of my enlarger-reducer I am able to project sharp, clear images of a size substantially greater and smaller than the negative-object without manual adjustment of the lens.

It is a well known fact that an image the same size as the object will be obtained when both the object plane and the image plane are spaced the distance of two focal lengths from the lens. Variations of said distances may produce larger or smaller images. Thus, to produce an image larger than the object, it is necessary to move the lens farther away from the image plane than would be the case where an image of the same size as the object is to be produced and, at the same time, it is necessary that the object be moved farther away from the image plane than would be necessary if an image of the same size as the object were to be produced. Where the image to be produced is smaller than the object, the lens must be advanced toward the image plane, assuming that the image plane is held stationary, but the object must be moved away from the image plane, assuming the object was at a distance of two focal lengths from the lens immediately before movement. A slight reduction in the size of the image in comparison with the size of the object requires a substantial movement of the object away from the image plane and the plane of the lens. Assuming a stationary image plane, the lens always approaches the image plane in shifting from one magnification to a lesser one but under the same conditions the object approaches the image plane until the magnification is 1:1 whereupon it reverses movement for lesser magnifications (reductions).

The distance between an object and a lens increases but little in shifting from a magnification of, say, five times the object size to, say, four times the object size whereas the distance between the lens and the object increases more rapidly when shifting from a magnification or enlargement of, say 1:2 to 1:1 and increases radically when shifting from 1:1 to 1:0.5. While the relative distance between the lens and the image as contrasted with the distance between the lens and the object is always a function of the magnification, the absolute distances between the lens and the object do not progress either arithmetically or geometrically in moving from one magnification to another. Great difficulty has been experienced in providing automatic means which can maintain the proper distance between the lens and the object because of the necessity to reverse the direction of movement of the object, referenced to the image plane, and radically change the rate of movement thereof when the image shifts from being larger than the object to being smaller than the object.

An object of my invention is to provide a commercially practical enlarger-reducer projector requiring but a single manual movement to produce any enlargement or reduction of which the projector is physically capable.

A further object of my invention is to provide an enlarger-reducer with a single hand adjustment enabling the operator to proceed throughout the entire range from extreme enlargement to extreme reduction without the necessity of adding to or subtracting from the controls required.

A further object of my invention is to provide a simple and automatic means of reproducing the object throughout the limits of range of the lens and object holder without adjustment of the lens.

A still further object of my invention is to provide an enlarger-reducer of the auto-focusing type having but few parts requiring repairs or adjustments.

The principles and characteristic features of my invention, and the manner of making, constructing and using my improved auto-focus enlarger-reducer will further appear in the accompanying drawings and the following description explaining the best mode in which I have contemplated applying such principles.

In the drawings,

Fig. 3 is an enlarged view of the extensible arm as seen from the back of my enlarger-reducer;

Fig. 4 is a top plan view in irregular section omitting the top bar of my enlarger-reducer in enlarging position; and Fig. 5 illustrates in schematic outline the positions of the lever and extensible arm in various enlarging and reducing positions.

Figure 1:
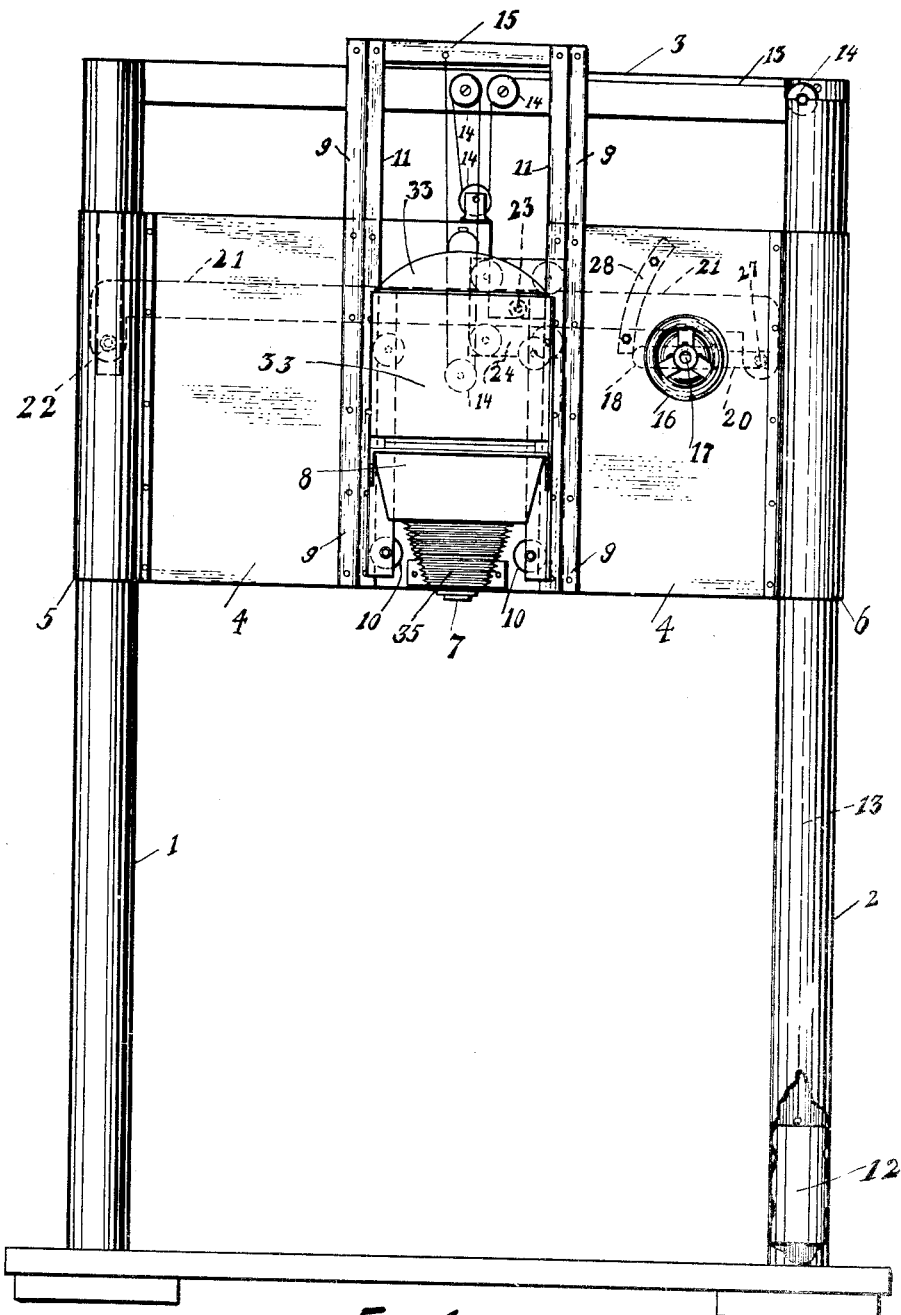
Fig. 1 is a front elevational view of my enlarger-reducer in enlarging position.
Figure 2:
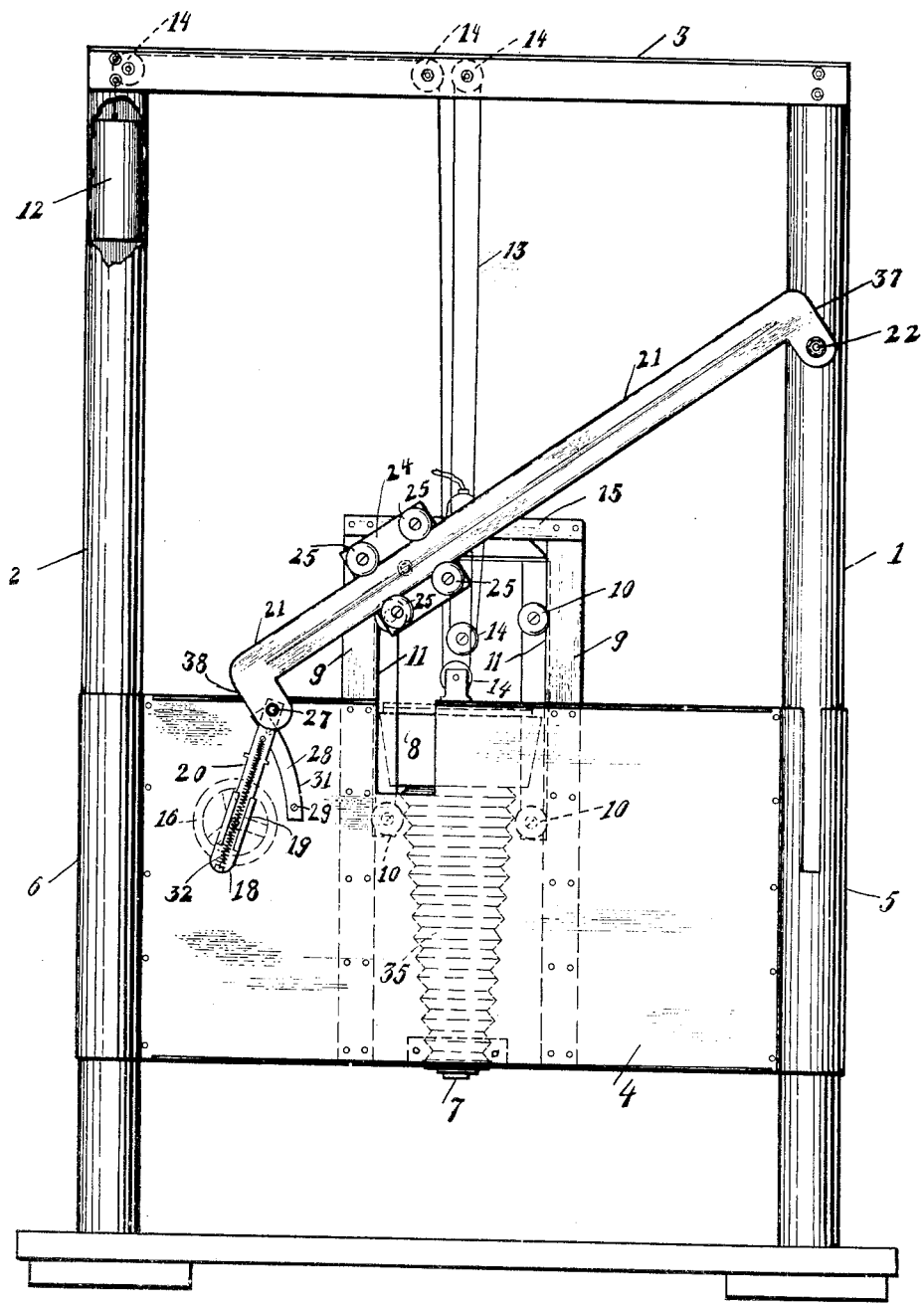
Fig. 2 is a rear elevational view of my enlarger-reducer in reducing position.

My auto-focus enlarger-reducer comprises a pair of standards 1 and 2 joined together at the top thereof by a cross-bar 3. Sheaths 5 and 6 enclose the standards 1 and 2 and are slideable therealong and are joined to either side edge of a frame 4, which extends between said standards. A lens 7 is rigidly mounted at the bottom of the frame 4 and moves with the frame 4 as it travels vertically along the standards 1 and 2.

An object or film holder 8 is slideably mounted above the lens 7 between a pair of vertical columns 9 which are attached to and extend throughout the depth of the frame 4 and above same. A set of rollers 10 mounted on the film holder 8 engage the edges 11 of the columns 9 and permit the object or film holder 8 to move freely therealong independently of the direction or rate of vertical movement of frame 4 and lens 7.

The frame 4 and the film holder 8 are balanced by a counterweight 12 movable vertically through the hollow standard 2. A wire or cord 13 extends from the counterweight 12 around a series of pulleys 14, mounted on the cross bar 3, frame 4 and housing 33, to a cross bar 15 which joins together the columns 9.

The frame 4 may be moved vertically by exerting a vertical force anywhere along the surface of the frame 4 or may be moved by turning the hand wheel 16. The hand wheel 16 is socketed on to the end of a pin 17 which is mounted in and projects through the frame 4. The other end of the pin 17 is secured to a radial arm 18, a portion of which forms a sheath 19 for enclosing the spring biased knife 20. One end of the knife 20 is freely slideable in said sheath 19 while the other has an aperture 36 for receiving the pin 27 which engages one end of the leg 21. The remote end of the leg 21 pivots on the bolt 22 held by the standard 1.

A boss 23 is mounted on the rear surface of the housing 33, which encloses the projection lamp 34 and a part of the film holder 8, and joins with a carriage 24 having wheels 25. The leg 21 moves lengthwise of the carriage 24, the channels 26 cut in the wheels 25 engaging the upper and lower edges of the leg 21. As above noted, the film holder 8 is constrained to move vertically along the columns 9 but as the film holder 8 is connected with the leg 21, through the carriage 24 and boss 23, arc movement of the leg 21 about the pivot 22 produces a vertical movement of the housing 33 and film holder 8 equivalent to the vertical movement of that point on the leg 21 which was opposite the boss 23 immediately preceding the movement of the leg 21. The lens 7 and the film holder 8 are joined by a conventional bellows 35.

Offsets 37 and 38 keep the longitudinal axis of the leg 21 away from the pivots 22 and 27.

Leg 21 in moving from its horizontal position shown in Fig. 1 moves clockwise and in so doing brings the pin 27, joining the knife 20 and the leg 21, in juxtaposition to the cam 28 after the knife 20 has been rotated through 180 degrees. The cam 28 is mounted on the frame 4 by means of the studs 29 projected therefrom. The pin 27 has a roller surface 30 which contacts the outer edge 31 of the cam 28 and moves therealong as soon as the knife 20 has been rotated more than 180 degrees from the position shown in Fig. 4. Movement of the roller along the edge 31 of the sector 28 results in the film holder 8 moving in a direction opposite to and away from the lens 7. A spring 32 biases the roller toward firm contact with the edge 31 of the cam 28 and keeps the knife 20 in its most retracted position when the roller 30 is not in engagement with the sector 28.

In normal operation the hand wheel 16 is revolved until the image obtained is of the desired size. No adjustment of the lens is necessary as the distance between the lens plane, image plane and the film holder plane is automatically adjusted by the movement of the housing 33, enclosing lamp 34 and film holder 8, along the columns 9 and the movement of the lens 7 on the frame 4 along the standards 1 and 2.

During the making of enlargements, the knife 20 connected with the radial arm 18 is in its most retracted position and, consequently, the end of the radial arm 18 moves in a semicircle which is concentric with the shaft 17 of the hand wheel 16. The turning of said arm 18 results in a relative movement of the lens 7 and film holder 8 relative to each other and the image plane in accordance with the formula:

$$\frac{1}{f} = \frac{1}{p} + \frac{1}{q}$$

where $f$ is the focal length of the lens; $p$ is the distance from the lens to the object; and $q$ is the distance from the lens to the image.

When, however, the image is to be smaller than the object the roller 30 engages the edge 31 of the cam 28 so that it moves outward away from the axis of the hand wheel shaft 17 and thereby displaces the pivotal connection between the leg 21 and the knife 20 with a resultant movement of the lens 7 and film holder 8 relatively to one another corresponding to the Newtonian equation for distances when the object is more than twice the focal length from the optical center.

The distance from the object to the image plane is exactly the same whether one considers a given enlargement or the reciprocal of same. That is to say, the distance from the film holder plane to the image plane is the same when the enlargement is, say, four as when the reduction is one-quarter. Likewise the distance between these points is the same when the enlargement is, say, two as when the reduction is one-half. In contrast, the lens plane has a plotted straight line approach to the image plane in proceeding from any magnification to any smaller magnification or reduction. Consequently, in proceeding from any magnification to a reduction the distance between the object and the lens plane gradually increases as they approach the image plane until the image and object are in the ration of 1:1, whereupon, the object moves away from the image plane and the distance between object and lens radically increases with every reduction. I have provided for this movement by the introduction of the spring biased knife 20 whereby the lens and object can move in different directions relative to the image plane whenever the image is smaller than the object.

The positions of the leg 21, knife 20 and sheath 19 are indicated in Fig. 5 for various enlargements and reductions varying from 1:0.5 to 1:6.5.

In constructing my enlarger-reducer I locate, preferably, the axis 17, about which the knife 20 rotates, on a line which is a distance of 2 focal lengths above the focal center of the lens 7. Using this reference line, I have derived formulae with which I can determine the proper effective length, $r$, of the radial arm 18, i. e., the distance from the center line of the pin 27 to the projected center line of the shaft 17 when the knife 20 is in its fully retracted position; the effective length of the leg 21; the distance, $h$, that the lens moves in proceeding from an enlargement of 1:1 with the knife in horizontal position of an enlargement which corresponds to a movement of the knife of 180° from its initial position; the distance, $w$, between the projected axis 17, of the radial arm 18 and the effective center of the boss 23; the proper offset, $x$, of the axis of the leg 21 above its point of pivot 22.

The effective length, $r$, of the radial arm 18, as above defined, where $f$ represents the focal length of the lens, may be determined from the formula:

$$r = \frac{.414 f \pi}{2}$$

The effective length L of the leg 21 may be determined from the formula:

$$L = 1.414 \ (r+f) + 2 \ (r+f)$$

The distance $h$ that the lens moves in proceeding from position 1:1 whereat the knife 20 is in a horizontal position, to a position whereat the knife 20 is in a horizontal position 180° away from said first position may be determined from the formula:

$$h = \sqrt{L^2 - (L-d)^2}$$

The distance $w$ between the projected axis of the radial arm 18 and the effective center line of the boss 23 (and carriage 24) may be determined from the formula:

$$w = (L-r) - \frac{L-r}{\sqrt{2}}$$

The offset, $x$, of the longitudinal axis of the leg L from the pivot 22 may be computed from the formula:

$$x = \frac{L}{\sqrt{2}} - h$$

The arc of the cam 28 has the general curve obtained from plotting the theoretical arc of the negative line in relation to the constant approach of the lens line as it proceeds toward the image plane. The plotted negative line will approach the image plane, though not with as rapid a rate as the lens line, until the enlargement is 1:1 whereupon the negative line will rapidly recede from the image plane while the lens line continues to approach the image plane line. While the theoretical arc is an approximation of the arc of the cam 28, the actual arc of the cam 28 must be determined by locating several known determinable reference points and plotting the arc therefrom. One of the reference points, the base of the cam 28, must be placed immediately adjacent the roller 30 when the apparatus is in the enlarging position 1:1 in order that the roller 30 instantly engages the edge 31 of the cam 28 when the apparatus is moved to permit of a reduction rather than of an enlargement. Obviously, the roller 30 and knife 20 are moved outwardly and away from the axis 17 in moving from position 1:1 to any reduction whatsoever.

It is thus apparent that given the focal length of any lens I can construct, by the use of the above formulae and the plotting of a simple arc, an enlarger-reducer which will be automatically focused at all times and which will permit the obtainment of an image which may be larger than or smaller than the object without the necessity of adding to or subtracting from the controls otherwise required and without any adjustment of the lens.

Having described my invention, I claim:

1. An optical system for projecting an image of an object comprising a pair of standards mounted on a base, a frame connecting and movable along said standards, a lens mounted on said frame, a holder for said object mounted above said lens and guided vertically by said frame but movable independently of said frame, an image plane on said base, a means for moving the lens and object holder relative to each other and to the image plane thereby to produce a sharp image at all times, said means including a leg pivoted on one of said standards and projecting toward said other standard, said leg being in engagement with said object holder, an arm movable about its own axis mounted in said frame, one end of said arm being joined with the extended end of said leg, the vertical movement of said lens and frame being controlled by said leg.

2. An auto-focus enlarger-reducer which comprises a pair of standards mounted on a base, an image plane formed by said base, a lens mounted on a frame spanning said standards and movable therealong, an object holder positioned above said lens and guided by said frame but movable relatively to said lens, a leg pivoted on one of said standards and extending toward the other of said standards, said leg being slideably engaged with said object holder, the projecting end of said leg connected with one end of an arm pivoted in said frame above said lens and having an extensible portion projecting toward the joining end of said leg, a sector having a cam surface mounted on said frame, a bearing surrounding the pivot joining said leg and said arm and engageable with said cam surface, said arm having means with which to rotate the leg and arm about their axes to thereby cause the lens and object holder to move relatively to each other and to the image plane and to produce an image which is in sharp focus at all enlargements or reductions.

3. An automatically focusing enlarger comprising a pair of vertical supports, a fixed image plane at the foot of said supports, an object holder slideably mounted in a frame movable along and guided by said supports, a lens mounted on said frame at the bottom thereof, and means for automatically focusing an image on said image plane, said means including a leg pivoted about one of said supports and slideably engaged with said object holder, and connected to one end of a radial arm on said frame.

4. An automatically focusing photographic enlarger comprising a pair of vertical supports, an image plane at the foot of said supports, an object holder slideably mounted in a frame movable along and guided by said supports, a lens fixed to said frame below said object holder, and means whereby said object holder and lens are moved automatically relatively to one another and to the image plane to produce automatic focusing of the image on the image plane, said means including a leg having one end pivoted on one of said supports and having frictional engagement between its ends with said object holder to move same vertically, and a radial arm pivoted on said frame and having one end engaging one end of said leg.

5. An automatically focusing photographic enlarger comprising a pair of vertical supports, a fixed image plane at the foot of said supports, an object holder slideably mounted in a frame movable along and guided by said supports, a lens mounted on said frame at the bottom thereof, a radial arm pivoted on said frame, an offset leg pivoted on one of said supports and joined to one end of said radial arm, said offset leg being slideably connected with said object holder to move same vertically, and means to rotate said radial arm whereby an image is automatically focused on the image plane when the effective length of the radial arm $r$ is $$r = \frac{.414 f \pi}{2}$$

when the effective length of the leg $L$ is $$L = 1.414\ (r+f) + 2\ (r+f)$$

when the effective length of the offset $x$ of the leg is $$x = \frac{L}{\sqrt{2}} - \sqrt{L^2 - (L-d)^2}$$

when the effective distance $w$ from the connection between the leg and the object holder to the point of joinder of the offset leg with the radial arm is $$w = (L-r) - \frac{L-r}{\sqrt{2}}$$

when the pivot point of the leg on said support is at a distance $p$ above the image plane of $$p = 4f + \sqrt{L^2 - (L-d)^2}$$

where $f$ represents the focal length of the lens and $d$ represents $2r$.

6. A leverage system for an autofocusing enlarger of the fixed image plane with movable object and lens type which comprises a leg pivotally mounted on a standard and slideably connected to the object holder and linked to the lens holder, and means for turning said leg about its pivot, said means including a radial arm substantially shorter than said leg and pivoted on the lens holder a substantial distance above the center of said lens and joined with the end of said leg away from said standard.

7. A leverage system for an autofocusing enlarger of the fixed image plane with movable object and lens type which comprises a leg pivotally mounted on a standard and slideably connected to the object holder and linked to the lens holder, and means for turning said leg about its pivot, said means including a cam sector mounted on the lens holder and an arm pivoted on the lens holder and having an extensible end connected to one end of said leg, the extensible end being adapted to move along in contact with said cam sector during a portion only of the movement of said leg about its pivot.

8. An automatically focusing photographic enlarger-reducer comprising a pair of vertical supports, a fixed image plane at the foot of said supports, an object holder slideably mounted in a frame movable along and guided by said support, a lens mounted on said frame below said object holder and above said image plane, and means for automatically focusing an enlarged image on said image plane, said means including a leg pivoted on one of said supports and slideably engaged with said object holder for vertical movement thereof, a spring biased extensible radial arm pivoted on said frame, and a roller pin joining the sweep end of said leg with said arm, and additional means for automatically focusing a reduced image on said image plane, said additional means including a cam sector mounted on said frame adjacent the end of the arm in retracted position, said roller pin being guided by said cam sector to cause the arm to extend with the resultant movement of the frame and object holder.

References Cited in the file of this patent

UNITED STATES PATENTS

| | | |
|---|---|---|
| 2,321,697 | Moulin | June 15, 1943 |
| 2,418,230 | Jacobson | Apr. 1, 1947 |